(12) United States Patent
Cheng

(10) Patent No.: US 6,616,367 B2
(45) Date of Patent: Sep. 9, 2003

(54) POSITION ADJUSTING MEANS FOR A BACK OF A STROLLER

(75) Inventor: Ying-Hsien Cheng, Tainan Hsien (TW)

(73) Assignee: Pao-Hsien Cheng, Tainan Hsien (TW)

( * ) Notice: Subject to any disclaimer, the term of this patent is extended or adjusted under 35 U.S.C. 154(b) by 0 days.

(21) Appl. No.: 09/884,066

(22) Filed: Jun. 20, 2001

(65) Prior Publication Data

US 2002/0197101 A1 Dec. 26, 2002

(51) Int. Cl.[7] .............................. F16D 1/12; F16D 1/00
(52) U.S. Cl. .............................. 403/85; 403/83; 403/84
(58) Field of Search .................. 280/47.38, 47.4, 280/641–643, 647, 650, 658; 297/354.12, 366–369, 374; 403/81, 83–85, 92, 93, 96, 99, 102, 104, 321, 322.1, 109.1–109.8

(56) References Cited

U.S. PATENT DOCUMENTS

| | | | | |
|---|---|---|---|---|
| 5,087,066 A | * | 2/1992 | Mong-Hsing | 280/644 |
| 5,143,398 A | * | 9/1992 | Teng | 280/642 |
| 5,195,770 A | * | 3/1993 | Ishikura | 280/648 |
| 5,547,256 A | * | 8/1996 | D'Antuono et al. | 297/377 |
| 5,687,985 A | * | 11/1997 | Sack | 280/650 |
| 5,722,682 A | * | 3/1998 | Wang | 280/642 |
| 5,752,738 A | * | 5/1998 | Onishi et al. | 297/61 |
| 5,806,877 A | * | 9/1998 | Huang | 280/642 |
| 5,887,935 A | * | 3/1999 | Sack | 296/122 |
| 6,220,776 B1 | * | 4/2001 | Reeves | 403/102 |
| 6,416,077 B1 | * | 7/2002 | Chen et al. | 280/642 |

* cited by examiner

*Primary Examiner*—James R. Brittain
*Assistant Examiner*—Ruth C. Rodriguez
(74) *Attorney, Agent, or Firm*—Rosenberg, Klein & Lee

(57) ABSTRACT

A position adjusting apparatus for a back of a stroller includes an engaging rod, a controlling slide member, and a positioning block. The positioning block is fixedly connected to at least one handle support rod of the stroller, and has several engaging protrusions each having a positioning gap formed adjacent thereto. The engaging rod is movably received in a lower tube portion of a frame of the back, and is connected to the controlling slide member movable along an outer side of the lower tube portion. A pivotal rod is connected to the positioning block and the lower tube portion, and passes through an elongated hole of the engaging rod to pivot the back frame on the positioning block. The engaging rod is biased by a spring to extend outward from the lower tube portion such that an engaging lower part thereof engages a selected one of the engaging protrusions to fix the back frame in position. The controlling slide member may be pushed to withdraw the engaging rod into the lower tube portion so as to disengage its engaging lower part from the engaging protrusion of the positioning block, freeing the back frame for position adjustment.

5 Claims, 8 Drawing Sheets

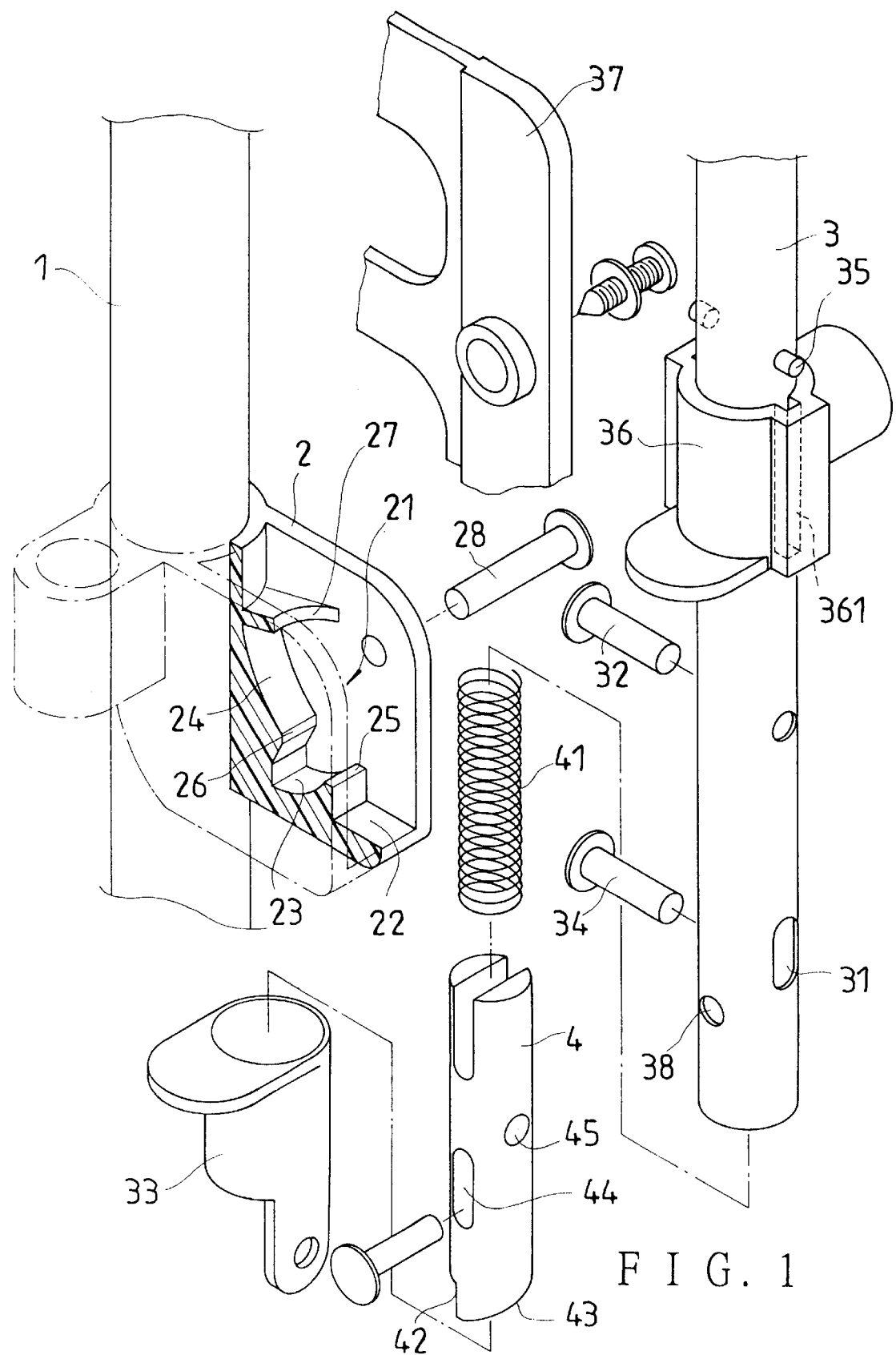
F I G. 1

POSITION ADJUSTING MEANS FOR A BACK OF A STROLLER

BACKGROUND OF THE INVENTION

The present invention relates to a position adjusting means for a back of a stroller, which is small in size, and substantially hidden in the frame of the stroller so that the dimensions of the stroller won't increase, and the stroller won't look less pleasant with the position adjusting means.

Most strollers available in the market are not provided with means for adjusting the position of the backs so little children can only sit in the strollers. These conventional strollers are neither comfortable nor suitable for babies because babies are too little to sit. Anyway, it is impossible for little children to lie down to sleep in the stroller when they want to.

Some strollers are provided with means for adjusting the position of the backs, however, the adjusting means take up too much space, and some parts show, increasing the dimensions of the strollers, and making the strollers look less pleasant.

SUMMARY OF THE INVENTION

Therefore, it is a main object of the present invention to provide a position adjusting means to the back of a stroller, which is compact, and substantially hidden to not affect the appearance of the stroller for the worse.

The position adjusting means of the present invention includes an engaging rod, a controlling slide member and a positioning block.

The positioning block is fixedly connected to one of the handle support rods of the stroller, and has an opening defined by two lateral walls, and several engaging protrusions therein. The engaging protrusion each has a positioning gap formed adjacent to it.

The engaging rod is movably received in a lower tube portion of the frame of the back, and is connected to the controlling slide member movable along an outer side of the lower tube portion. A pivotal rod is connected to the positioning block and the lower tube portion, and is passed through an elongated hole of the engaging rod to pivot the back frame on the positioning block.

The engaging rod is biased outwardly of the lower tube portion by a spring for an engaging lower end thereof to engage one of the engaging protrusions to fix the back frame in position. The controlling slide member is pushed to move the engaging rod inwardly of the lower tube portion for the engaging lower end to disengage the engaging protrusions of the positioning block, permitting the back frame to pivot on the pivotal rod for adjustment of position.

As can be seen, the engaging protrusions of the positioning block are substantially hidden between the lateral walls. And, the controlling slide member and the engaging rod don't increase the dimensions of the stroller.

BRIEF DESCRIPTION OF THE DRAWINGS

This invention will be better understood by referring to the accompanying drawings, wherein:

FIG. 1 is an exploded perspective view of the position adjusting device for a back of a stroller according to the present invention.

DETAILED DESCRIPTION OF THE PREFERRED EMBODIMENTS

Figure 2:
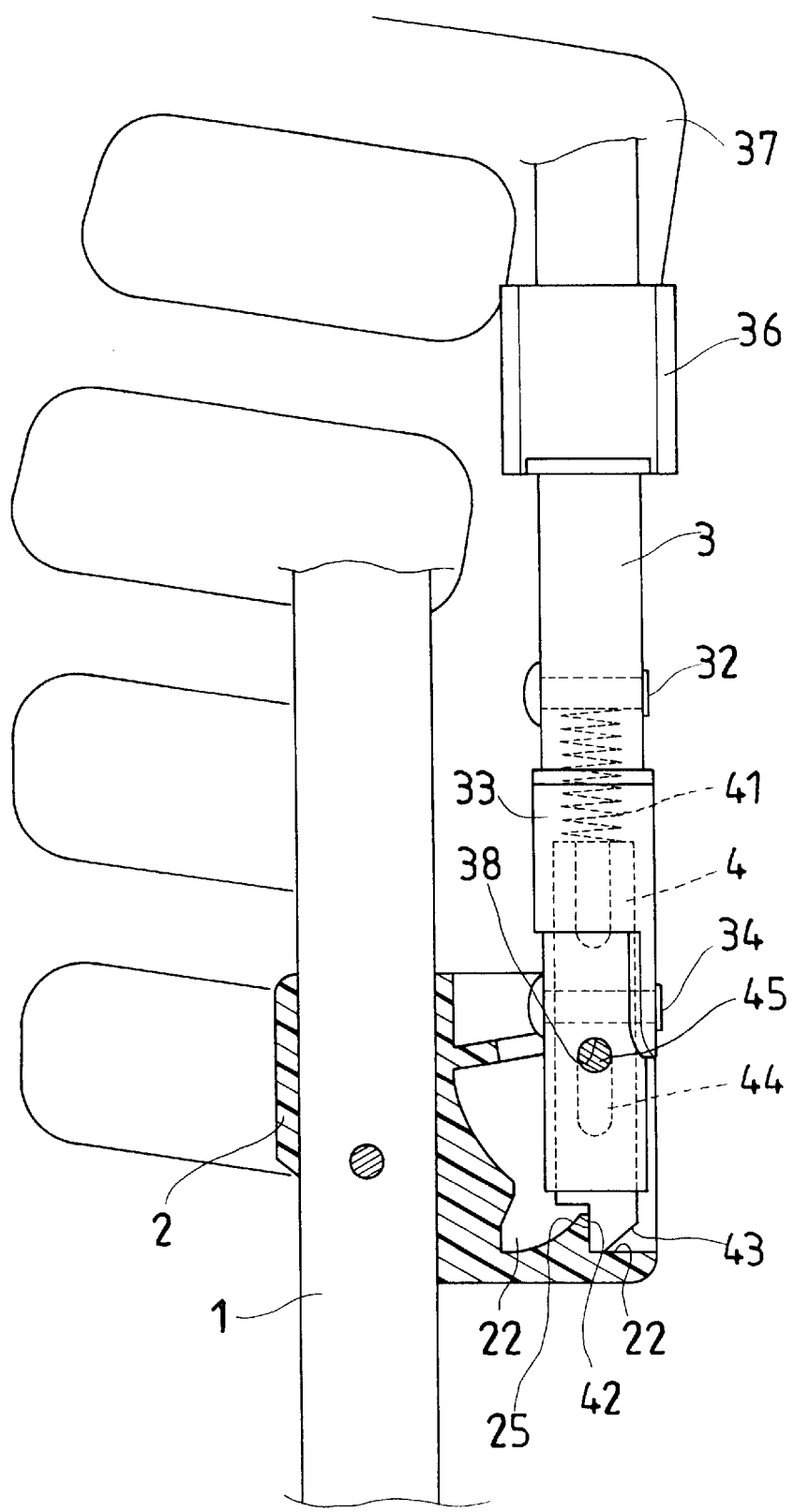
FIG. 2 is a side view of the position adjusting device for a stroller back of the present invention.
Figure 3:
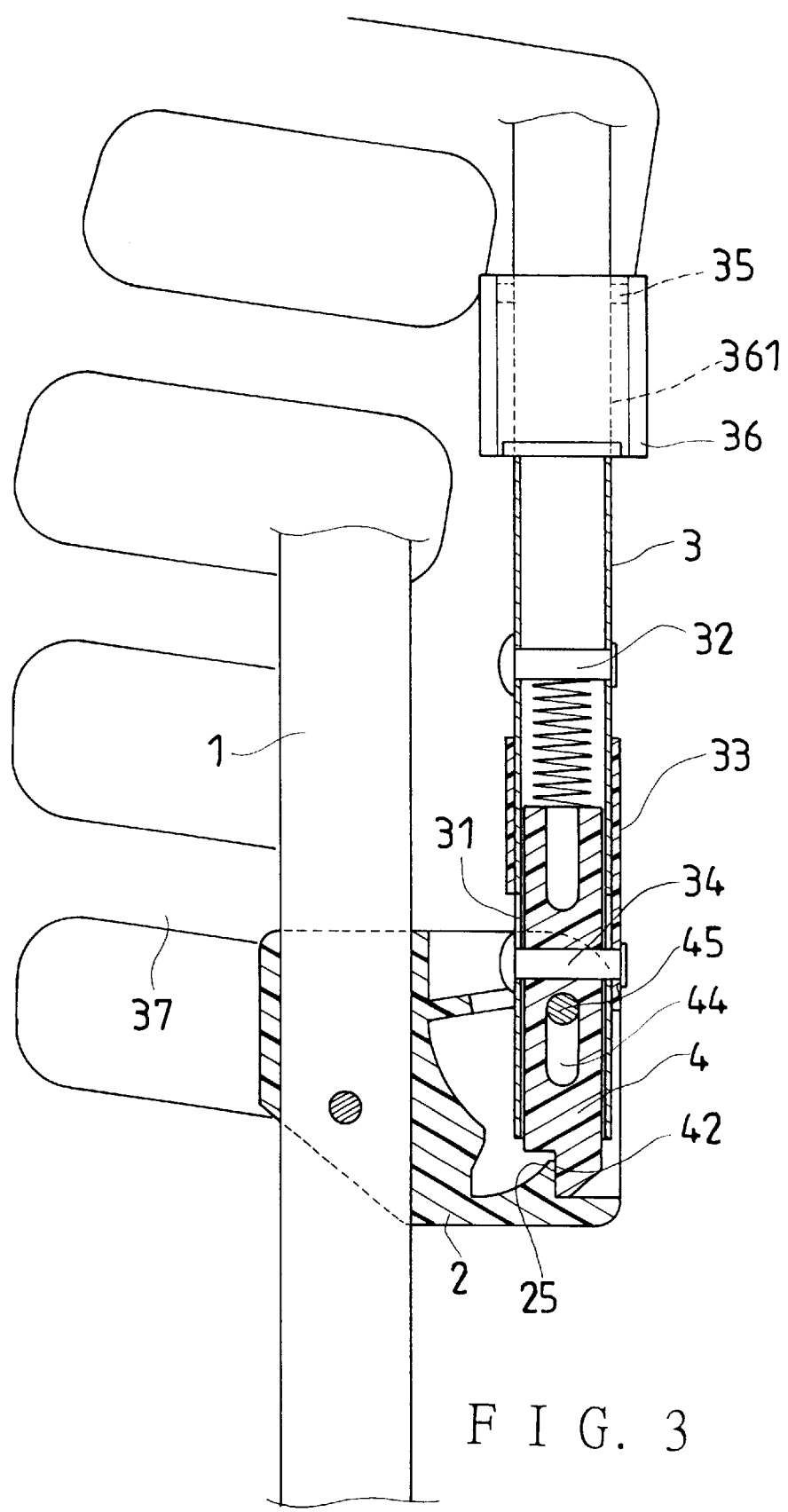
FIG. 3 is a cross-sectional view of the position adjusting device for a stroller back in FIG. 2.
Figure 4:
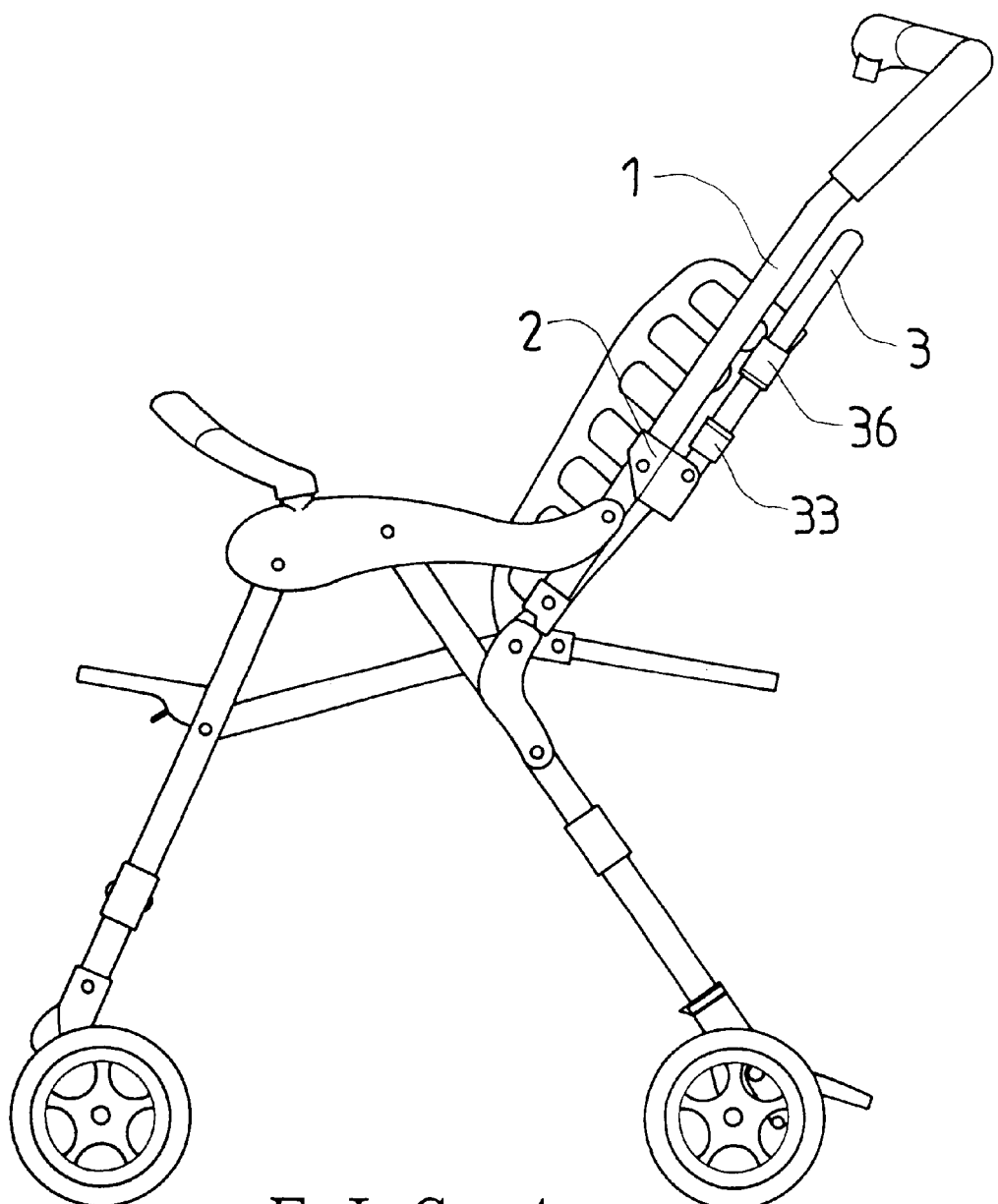
FIG. 4 is a side view of a stroller with the position adjusting device for a back of the present invention.
Figure 5:
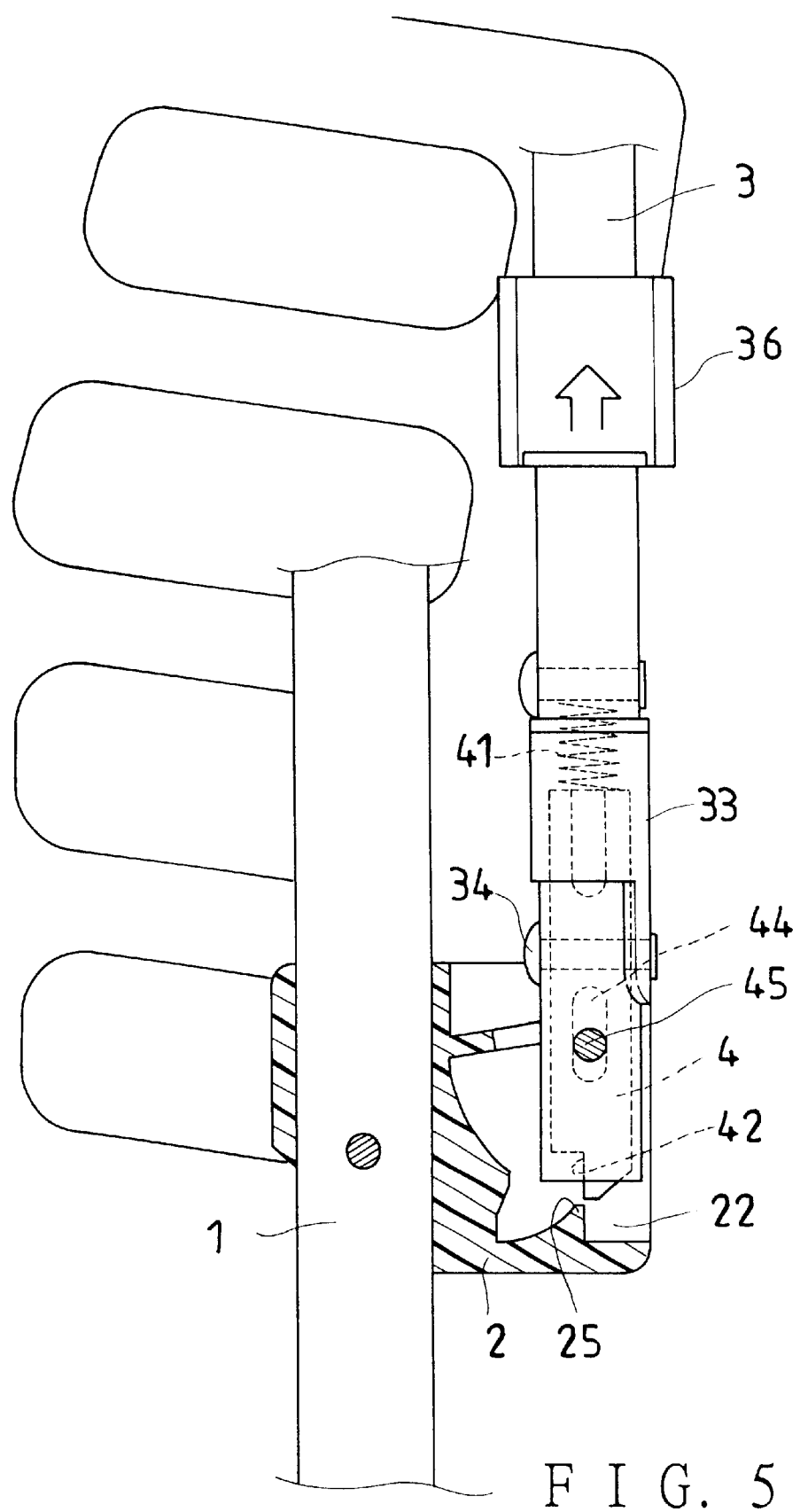
FIG. 5 is a cross-sectional view of the device in FIG. 2 under the adjustment movement.
Figure 6:
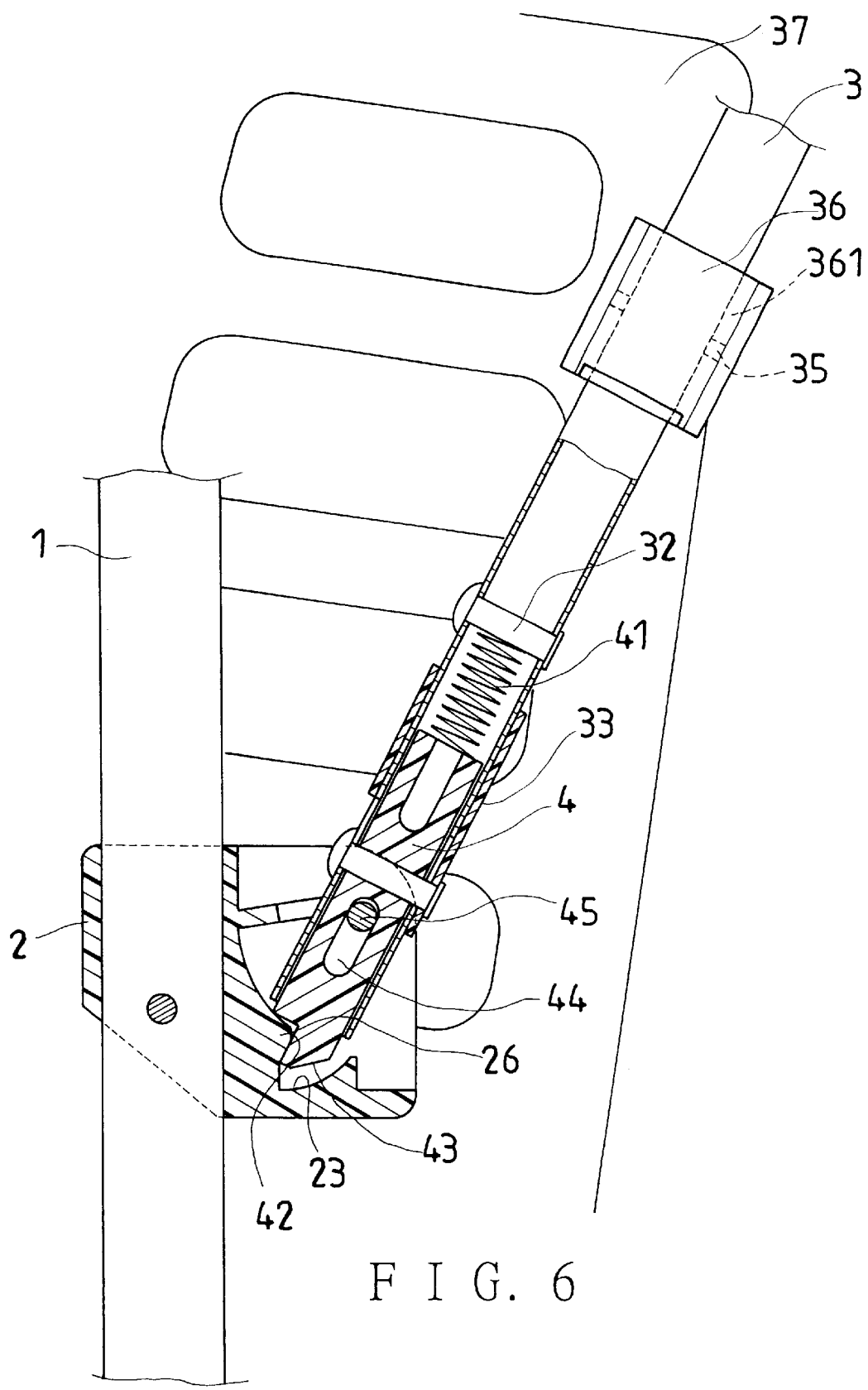
FIG. 6 is a cross-sectional view of the device in FIG. 2 under a second position for fixing the back frame of the stroller in a sloping position.
Figure 7:
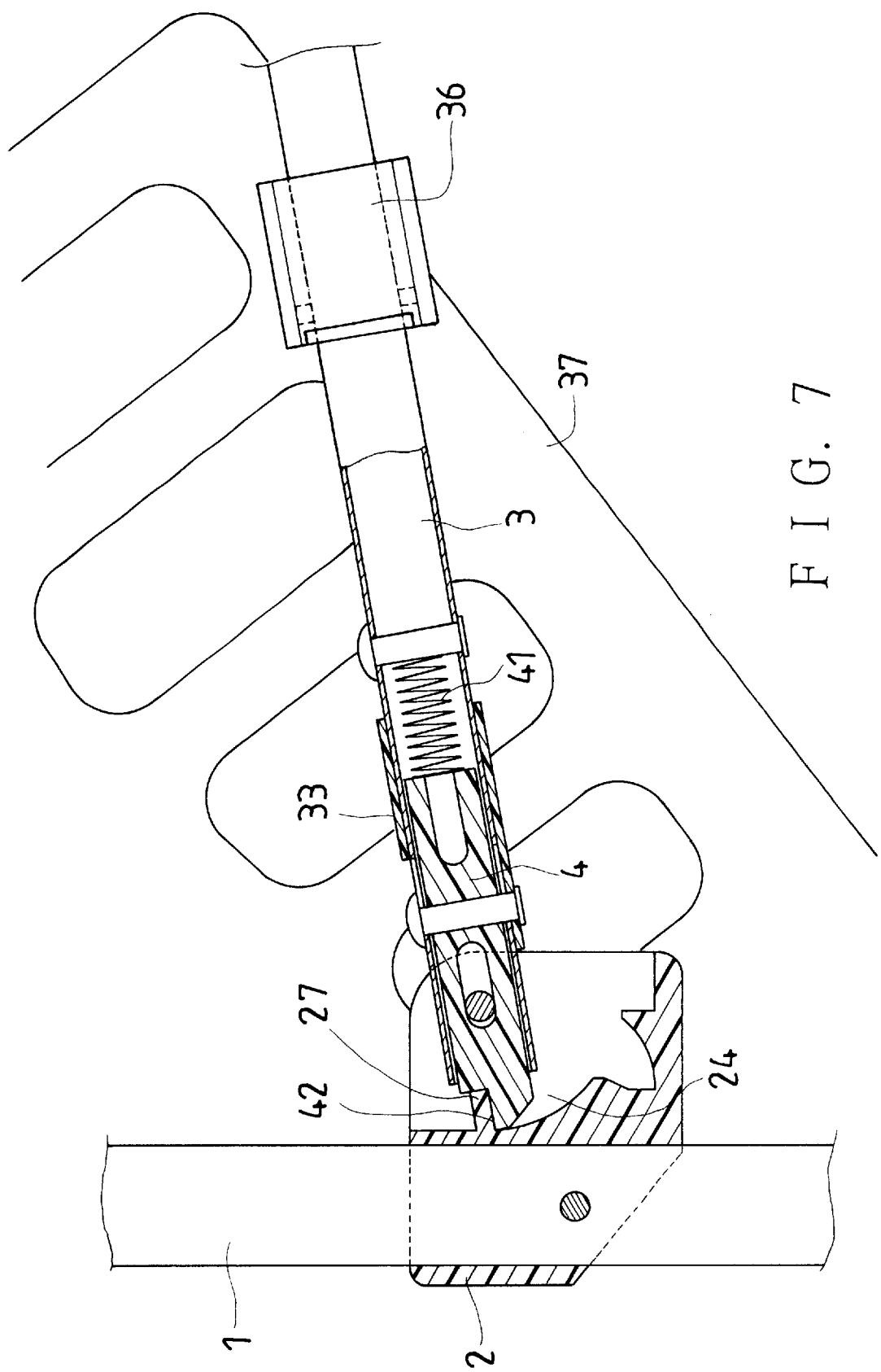
FIG. 7 is a cross-sectional view of the device in FIG. 2 under a third position for fixing the back frame of the stroller in a flat position.
Figure 8:
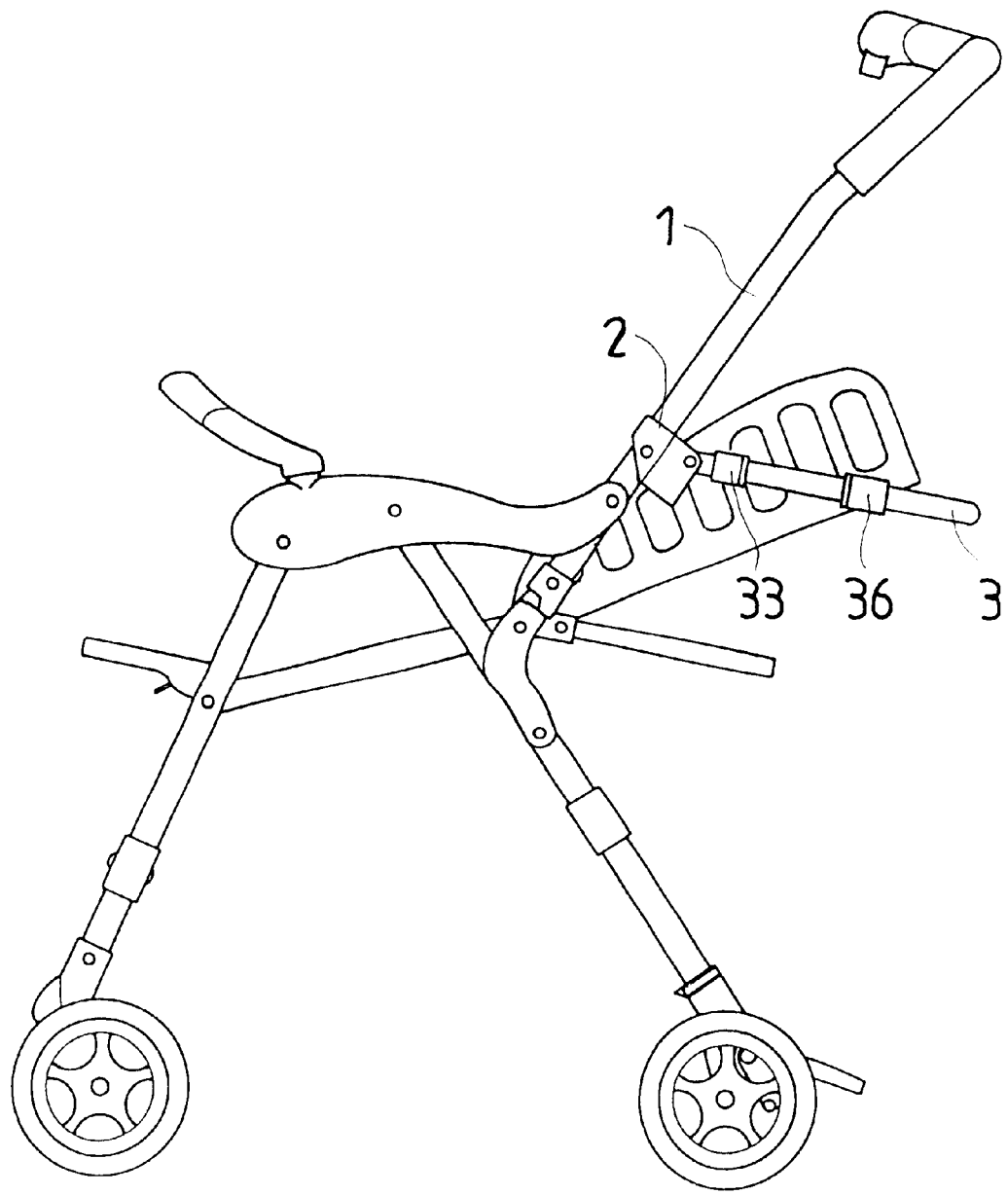
FIG. 8 is a side view of a stroller with the device of the present invention being moved to the third position.

Referring to FIGS. 1, 2 and 8, a position adjusting means for a back of a stroller has two positioning blocks 2, engaging rods 4, controlling slide members 33 and slide blocks 36.

The positioning blocks 2 are secured to middle portions of handle support rods 1 of the stroller, and each has an opening 21 formed between two lateral walls (not numbered) thereof. The positioning blocks 2 each has a first engaging protrusion 25 in a lower part of the opening 21, a third engaging protrusion 27 in an upper part of the opening 21 and a second engaging protrusion 26 between the first and the third engaging protrusions 25 and 27. The protrusions 25, 26 and 27 each has a positioning gap 22, 23 and 24 formed adjacent to it.

The engaging rods 4 are slidably passed through lower tube portions of the frame 3 of the back with connecting elements 34 passing through elongated holes 31 of the lower tube portion of the frame 3 and connecting holes 45 of the engaging rods 4. Elastic members 41 are disposed on tops of the engaging rods 4, and are prevented from moving up by confining elements 32 fixedly connected to the frame 3. Thus, the engaging rods 4 are biased downwards by the elastic members 41.

Pivotal rods 28 are passed through the lateral walls of the positioning block, pivotal holes 38 of the lower tube portions and elongated holes 44 of the engaging rods 4 so that the frame of the back can pivot on the positioning blocks 2.

The controlling slide members 33 are connected to outer sides of the lower tube portions of the back frame 3, and can slide along same. The connecting elements 34 further pass through the controlling sliding member so that the engaging rods 4 can move along the lower tube portions when the controlling slide members 33 are pushed.

The frame 3 of the back further has two pairs of lateral guide protrusions 35 on the outer sides. The slide blocks 36 are connected to the outer sides of the back frame 3, and can move along same. The slide blocks 36 each has two guide slots 361 for the lateral protrusions 35 of the back frame 3 to be received therein.

The back of the stroller has lateral confining members 37, which are pivoted to the main structure of the stroller from lower ends, and pivoted to the slide blocks 36 from upper portions (FIGS. 1 and 8).

The back frame 3 associated with the lateral confining members 37 can be pivoted to a first supporting position (FIG. 2) where the engaging parts 42 of the engaging rods 4 passing into the first positioning gap 22 to engage the first engaging protrusion 25 of the positioning block 2; a little child can sit in the stroller with its back being upright when the engaging rod 4 engages the first engaging protrusions 25. The back frame 3 can be pivoted to a second supporting position where the engaging parts 42 engage the second engaging protrusions 26, permitting a baby to lie in the stroller with a sloping back. The back frame 3 can be pivoted to a third supporting position where the engaging parts 42 engage the third engaging protrusions 27, permitting a baby to lie in flat in the stroller.

Because the lateral confining members 37 are pivoted to the slide blocks 36 from the upper portions, same can move smoothly together with the back frame 3. And, the guide protrusions 35 in the guide slots 361 can help the slide blocks 36 move smoothly along the frame 3.

To change the position of the back frame 3, the controlling slide members 33 are pushed towards the upper end of the back frame 3 for the engaging rods 4 to move up disengage the engaging protrusion 25 (or 26, 27). Then, the back frame 3 is pivoted on the pivotal rod 28 for the engaging part 42 to face a desired one of the engaging protrusions, and controlling slide members 33 are released for the engaging rods to be biased down to engage the corresponding engaging protrusion by the elastic members 41. Thus, the engaging rod 4 and the back frame 3 are fixed at a new position.

Moreover, the engaging rods 4 each has a sloping surface 43 at the lower end opposing the engaging part 42. When the user wants to pivot the back frame 3 from the third protrusion 27 to the second one 26, she only has to push the upper part of the frame up because the sloping surface 43 of the engaging rod 4 can smoothly slide on the bottom of the third positioning gap 24, and the engaging rods 4 can move upwards automatically on the pivotal movement of the back frame 3. Similarly, the user only has to push the upper end of the back frame 3 upwards to pivot the back frame 3 from the second protrusion 26 to the first one 25 because the engaging rod 4 can move up automatically due to the contact of the sloping surface 43 with the bottom of the second positioning gap 23. Therefore, the user has to push the controlling slide members 33 only when the back frame 3 is moved in the direction from the upright position towards the flat position.

From the above description, the position adjusting device for a back of a stroller of the present invention can be known to be relatively compact, and substantially hidden. Therefore, the position adjusting device won't increase the dimensions of the stroller or affect the appearance of the stroller for the worse.

What is claimed is:

1. A position adjusting apparatus for a back of a stroller comprising:

an engaging rod telescopically received in a lower tube portion of a frame of said back of said stroller for coaxial displacement relative thereto; said engaging rod being connected to a controlling slide member movably fitted to an outer side of said lower tube portion to be slid together with said controlling slide member along said lower tube portion; said engaging rod being biased down with a lower end engaging part protruding from said lower tube portion by an elastic member;

a positioning block, said positioning block being fixedly connected to a handle support rod of said stroller; said positioning block having an opening defined by two lateral walls, and a plurality of engaging protrusions therein; said engaging protrusions each having a corresponding positioning gap formed adjacent thereto; said lower tube portion being pivoted to at least one said lateral wall by a pivotal rod passing through an elongated hole of said engaging rod to move said engaging rod to face one of said engaging protrusions on pivotal movement thereof;

said lower end engaging part passing into said positioning gaps to engage said engaging protrusions of said positioning block when said engaging rod is biased down by said elastic member, fixing said back frame in position; said engaging rod being disengaged from said engaging protrusions by sliding said controlling slide member inwardly of said lower tube portion, permitting said back frame to be moved for adjusting a position thereof.

2. The position adjusting means for a back of a stroller as claimed in claim 1, wherein said elastic member is disposed on a top of said engaging rod, and a top of said elastic member is confined by a confining element connected to said back frame.

3. The position adjusting means for a back of a stroller as claimed in claim 1, wherein said engaging rod is connected to said controlling slide member by means of a connecting element passing through an elongated hole formed lengthwise on said lower tube portion of said back frame.

4. The position adjusting means for a back of a stroller as claimed in claim 1, wherein said engaging rod has a sloping surface on a lower end opposing said engaging part for permitting said positioning gaps to contact said sloping surface to push said engaging rod inwardly of said lower tube portion without pushing said controlling slide member when said back frame is pivoted on said positioning block for adjustment of position thereof in a direction from one of said engaging protrusions to a lower adjacent one of said engaging protrusions.

5. The A position adjusting apparatus for a back of a stroller comprising:

an engaging rod movably received in a lower tube portion of a frame of said back of said stroller; said engaging rod being connected to a controlling slide member movably fitted to an outer side of said lower tube portion to be slid together with said controlling slide member along said lower tube portion; said engaging rod being biased down with a lower end engaging part protruding from said lower tube portion by an elastic member;

a positioning block, said positioning block being fixedly connected to a handle support rod of said stroller; said positioning block having an opening defined by two lateral walls, and a plurality of engaging protrusions therein; said engaging protrusions each having a corresponding positioning gap formed adjacent thereto; said lower tube portion being pivoted to at least one said lateral wall by a pivotal rod passing through an elongated hole of said engaging rod to move said engaging rod to face one of said engaging protrusions on pivotal movement thereof;

said lower end engaging part passing into said positioning gaps to engage said engaging protrusions of said positioning block when said engaging rod is biased down by said elastic member, fixing said back frame in position; said engaging rod being disengaged from said engaging protrusions by sliding said controlling slide member inwardly of said lower tube portion, permitting said back frame to be moved for adjusting a position thereof;

said back frame having a slide block movably connected to an outer side thereof for permitting a lateral confining member to be pivoted thereto; said back frame having guide protrusions fitted onto guide slots of said slide block.

* * * * *